United States Patent
Fontaine et al.

(10) Patent No.: US 9,549,420 B2
(45) Date of Patent: Jan. 17, 2017

(54) METHOD OF REMOTELY WAKING UP WIRELESS ROUTER EQUIPMENT

(71) Applicant: Orange, Paris (FR)

(72) Inventors: Fabrice Fontaine, Geveze (FR); Fabrice Baranski, Chantepie (FR); Simon Gloanec, Rennes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/410,511

(22) PCT Filed: Jun. 7, 2013

(86) PCT No.: PCT/FR2013/051322
§ 371 (c)(1),
(2) Date: Dec. 22, 2014

(87) PCT Pub. No.: WO2013/190211
PCT Pub. Date: Dec. 27, 2013

(65) Prior Publication Data
US 2015/0237658 A1 Aug. 20, 2015

(30) Foreign Application Priority Data

Jun. 21, 2012 (FR) ...................................... 12 55828

(51) Int. Cl.
*H04W 76/02* (2009.01)
*H04W 52/02* (2009.01)
(Continued)

(52) U.S. Cl.
CPC ............. *H04W 76/02* (2013.01); *H04W 12/06* (2013.01); *H04W 52/0206* (2013.01); *H04W 84/12* (2013.01)

(58) Field of Classification Search
CPC ...... H04W 12/15; H04W 88/08; H04W 8/005; H04W 12/08
See application file for complete search history.

(56) References Cited

U.S. PATENT DOCUMENTS

| | | | |
|---|---|---|---|
| 2006/0236376 A1* | 10/2006 | Liu | ........................ H04L 63/08 726/4 |
| 2010/0008276 A1 | 1/2010 | Kopikare et al. | |
| 2012/0026925 A1 | 2/2012 | Vempati | |

FOREIGN PATENT DOCUMENTS

| | | |
|---|---|---|
| EP | 2273828 A1 | 1/2011 |
| WO | 2004075583 A1 | 9/2004 |
| WO | 2011134910 A1 | 11/2011 |

OTHER PUBLICATIONS

International Preliminary Report on Patentability and English translation of Written Opinion dated Dec. 23, 2014 for corresponding International Patent Application No. PCT/FR2013/051322, filed Jun. 7, 2013.

(Continued)

*Primary Examiner* — Curtis A Alia
(74) *Attorney, Agent, or Firm* — David D. Brush; Westman, Champlin & Koehler, P.A.

(57) ABSTRACT

A method is provided for controlling equipment provided with a function for controlling a bidirectional radio link in reception and in transmission. The equipment is configured for connecting with at least one terminal of a home network via said radio link. The method includes: inhibiting the radio link in transmission; listening to the radio link in reception; detecting a wakeup identifier on the radio link; verifying the validity of the terminal that sent the wakeup identifier; and as a function of the value of this identifier and of the validity of the terminal that sent it, activating the radio link in transmission. Also provided is equipment having a function for controlling a radio link.

9 Claims, 3 Drawing Sheets

(51) Int. Cl.
*H04W 12/06* (2009.01)
*H04W 84/12* (2009.01)

(56) References Cited

OTHER PUBLICATIONS

International Search Report and Written Opinion dated Jul. 19, 2013 for corresponding International Application No. PCT/FR2013/051322, filed Jun. 7, 2013.
French Search Report and Written Opinion dated Nov. 28, 2012 for corresponding French Application No. 1255828, filed Jun. 21, 2012.

\* cited by examiner

METHOD OF REMOTELY WAKING UP WIRELESS ROUTER EQUIPMENT

CROSS-REFERENCE TO RELATED APPLICATIONS

This application is a Section 371 National Stage application of International Application No. PCT/FR2013/051322, filed Jun. 7, 2013, the content of which is incorporated herein by reference in its entirety, and published as WO 2013/190211 on Dec. 27, 2013, not in English.

TECHNICAL FIELD

The invention relates to the field of telecommunications, and more particularly to WiFi type radio communication. The term "WiFi" (for wireless fidelity) covers wireless transmission technologies that enable wireless computer networks to be created that are based on the standards of the IEEE 802.11 family.

In general manner, the invention applies to any equipment having a WiFi type wireless communication function, and more particularly it relates to router equipment of a home network that has such a WiFi function. The term "WiFi function" is used under such circumstances to mean those hardware and software elements that enable the equipment to perform its data exchanges wirelessly over a radio link in the WiFi network.

A home network is a computer network that interconnects, with or without wires, the terminals (computers, printer peripherals, storage peripherals, . . . ) in a home that are suitable for communicating with one another. A home network generally includes router equipment, also known as a gateway, constituting an intermediate element serving to redirect, i.e. to "route", data packets between the various terminals and networks with which it is connected.

STATE OF THE ART

Equipment having a WiFi function consumes energy. In particular, WiFi communication between two wireless appliances assumes that information is exchanged continuously over the radio channel. It is therefore common practice to switch such equipment off electrically when there is no need to use it. Nevertheless, if the equipment is off, then its WiFi function is not usable. Furthermore, if the equipment is a router, then none of the other terminals in the network can communicate wirelessly with other equipment in the wireless network or with equipment outside the home network.

In order to wake up the WiFi function in such router equipment, several solutions may be envisaged: the appliance may be switched on electrically or its WiFi function may be switched on (a switch is often provided that is dedicated to activating the WiFi function), which assumes physical presence close to the equipment. It is also possible to program time periods of non-use during which the router and/or its WiFi function are deactivated, but under such circumstances, all communication is deactivated. It is also possible to use some other wireless network (e.g. a mobile telephone network) or a wired network (e.g. an Ethernet cable) in order to access the router and instruct it to wake up, if it was on standby, but that requires access to such another network.

The invention provides a solution that does not present the drawbacks of the prior art.

SUMMARY OF THE INVENTION

To this end, in a functional aspect, the invention provides a method of controlling equipment having a function for controlling a bidirectional radio link in reception and in transmission, the equipment being designed to connect with at least one terminal of a home network via said link, which method is characterized in that it comprises the steps of:
  inhibiting the radio link in transmission;
  listening to the radio link in reception;
  detecting a wakeup identifier on the radio link;
  verifying the validity of the terminal that sent the wakeup identifier; and
  as a function of the value of this wakeup identifier and of the validity of the terminal that sent it, activating the radio link in transmission.

Thus, the invention provides the advantage of deactivating the radio link in transmission while continuing to listen for a wakeup identifier in reception. It is thus possible to wake up the router equipment by means of the WiFi network itself, while keeping down the electricity consumption of the equipment. The active standby mode proposed by the invention, characterized by the radio link being inhibited in transmission, leads to low energy consumption since the radio is activated in reception only, in order to listen for the wakeup identifier, with data transmission being inhibited. Furthermore, unlike the prior art, there is no need to have access to the equipment via a wired link, or via any other medium, nor is there any need to take physical action on the equipment in order to activate its WiFi function. The invention makes it possible to wake up the WiFi function of the router equipment by using the WiFi network itself. Advantageously, the terminal that sends the wakeup identifier must be a terminal that is valid for waking up the gateway, i.e. equipment that has already been associated with said gateway, so the gateway has stored one of its identifiers, e.g. the media access control (MAC) address, which is unique and representative of the terminal.

In a particular implementation of the invention, a method as described above is characterized in that activation of the radio link in transmission becomes effective after the equipment has received a request for communication.

This implementation of the invention makes it possible to save more energy. On being woken up in transient manner, the equipment of the invention recloses its WiFi link in order to return to its active standby mode, if it does not receive a specific request for connection from a WiFi terminal within a certain time lapse. In contrast, if it does receive a request for communication, it can leave that mode completely in order to wake up its WiFi function.

In a second particular implementation of the invention, which may be implemented as an alternative to the above implementations or together therewith, a method as described above is also characterized in that the step of listening to the radio link in reception includes periods during which the radio link is inhibited in reception.

This variant serves to further reduce emergency consumption since in this variant of the active standby mode, the radio channel is also inhibited in reception for some of the time, e.g. for half of a cycle that is defined in terms of seconds.

In a third particular implementation of the invention, which may be implemented as an alternative to the above implementations or together therewith, the method as described above is also characterized in that the equipment further includes functional modules that are activated after a step of activating said radio link in transmission.

This variant serves to further reduce the energy consumption of the equipment by keeping energy-consuming peripherals (hard disks, USB connected terminals, etc.) on standby so long as the equipment has not completely left its standby state.

In a fourth particular implementation of the invention, which may be implemented as an alternative to the above implementations or together therewith, the step of listening to the radio link in reception includes adapting listening power.

It is thus possible to reduce the receive power of the antenna in order to consume less energy while the equipment is in its active standby mode. This is advantageous, in particular if the wakeup terminal can come close to the equipment, or indeed if the relative position between the equipment and the terminal is unchanging.

In a fifth particular implementation of the invention, which may be implemented as an alternative to the above implementations or together therewith, the step of listening to the radio link in reception includes selecting a listening frequency.

It is thus possible to select the radio channel for receiving the wakeup identifier so as to consume less energy, since under such circumstances the equipment can make do with listening to this channel only instead of scanning all possible channels or frequency ranges.

In a hardware (structural) aspect, the invention also provides equipment provided with control means for controlling a radio module in order to connect with at least one terminal of a home network, the equipment being characterized in that it comprises:

inhibit means for inhibiting the radio link in transmission;
listener means for listening to the radio link in reception;
detector means for detecting a wakeup identifier on the radio link;
verification means for verifying the validity of the terminal that sent the wakeup identifier; and
activation means for activating the radio link in transmission as a function of the value of the wakeup identifier and of the validity of the terminal that sent it.

In another hardware aspect, the invention also provides a signal carrying a wakeup identifier of the method.

In another hardware aspect, the invention also provides a computer program suitable for being performed on the equipment as defined above, the program comprising code instructions that, when the program is executed by a processor, perform the steps of the above-defined method.

The invention can be better understood in the light of the following description given by way of example and made with reference to the accompanying drawings.

THE FIGURES

DETAILED DESCRIPTION OF AN EMBODIMENT ILLUSTRATING THE INVENTION

Figure 1:
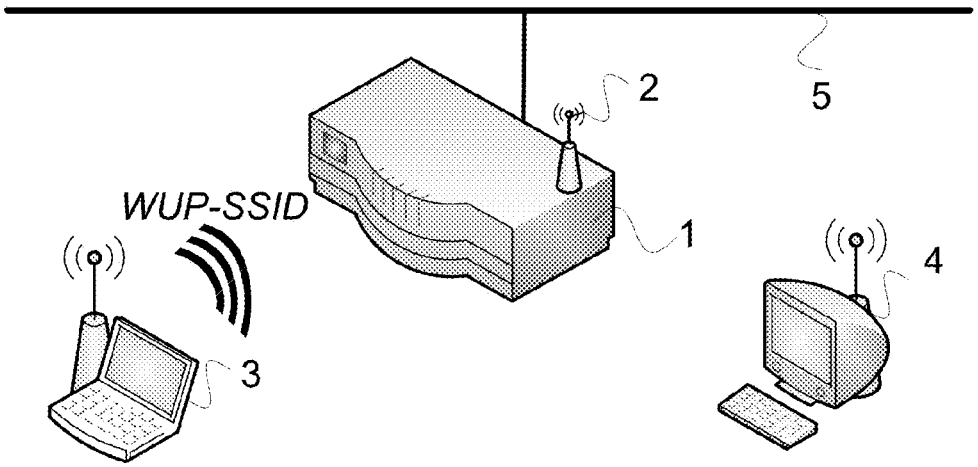
FIG. 1 shows a wireless network of the invention.

FIG. 1 shows an example of a wireless network of the invention. A terminal 3 and a terminal 4 are suitable for setting up connections with router equipment 1, also known as a "home gateway", that is connected to the Internet 5 via a broadband connection. By way of example, the home network is an Internet protocol (IP) local network, and the broadband connection is of the asymmetric digital subscriber line (ADSL) type.

The router equipment 1 may for example be a home gateway known under the trade name "Livebox". It has a WiFi communication function or "access point" that enables it to communicate with the terminals of the wireless network. Below, the terms "access point" and "WiFi function" are used interchangeably to designate the communication function of such router equipment. The access point includes a bidirectional radio module for transmitting or receiving signals over the physical link, namely the radio link that is represented by radio waves 2 at the antenna.

By way of example, the terminal 3 is a laptop computer. Below, the term "terminal" is used to designate any device suitable for making a WiFi connection with the router, such as a laptop computer or a device of the personal digital assistant (PDA) type, or more generally any equipment suitable for performing WiFi communication and for implementing a wakeup module of the invention. By way of example, the terminal 4 is a computer or a PDA or a printer etc., or more generally any equipment suitable for making a connection with the router in WiFi mode.

In the prior art, in order to access the router from the terminal 3, a user inputs identification parameters of the WiFi network into the terminal. In particular, the user inputs or selects the name of the home network, known to the person skilled in the art as the service set identifier or "SSID", which is usually in the form of an alphanumeric string (e.g.: "Livebox_666"), together optionally with an access key to the home network, such as a wired equivalent privacy (WEP) or a WiFi protected access (WPA) access key of function and structure that are well known to the person skilled in the art.

The access point is generally activated by default in the home gateway, which thus consumes a large amount of energy. In particular, the access point broadcasts its SSID continuously in order to inform terminals of its presence. In order to save energy, an obvious solution would be to switch off the home gateway when it is not in use. That presents the drawback of making it necessary to switch it back on again manually, or else by means of a wired command (Ethernet). A user can thus program time periods during which the router equipment is switched off or is in deep standby. However in this mode, the other functions of the equipment, e.g. managing certain telephone communications, or watching television over the Internet, can no longer be provided. In order to have access once more to the home network via the access point, the user must wait until the end of the time period or else must switch on the router equipment manually, which is constricting. Alternatively, the user could switch off only the access point (there is a special switch for that purpose on the Livebox). Under such circumstances, no appliance can connect to the wireless network until the access point has been reactivated.

In other words, in the prior art, equipment of the kind described above may have its access point in an active state (bidirectional WiFi communication, thereby consuming energy continuously), switched off, or on standby (no WiFi communication in transmission or in reception).

According to the invention, the access point also has an additional mode referred to as "active standby" that is controlled by a specific active standby module (MVA). In this intermediate mode, the radio link is active in reception only and it is inhibited in transmission, i.e. data transmission is made impossible. This saves energy consumption since data is no longer transmitted. The access point is capable only of listening to the radio link and of determining whether it has indeed received the wakeup identifier that enables it to leave the active standby mode. By way of example, the wakeup identifier is a specified SSID, referred to below as the WUP-SSID, which is broadcast in this example by the terminal 3. When the router receives this wakeup identifier WUP-SSID, it leaves active standby, it wakes up its WiFi function in transmission, and communication can restart normally over the wireless network.

In a variant, it is also possible to limit the reception range of the radio link when in an active standby state. For example, when configuring the router equipment, provision may be made for it to receive a parameter concerning the power desired on reception, for example a percentage reduction of the reception power on the radio channel relative to a maximum power.

In another variant, it is possible to listen only on a dedicated channel, i.e. on a certain frequency. In the prior art, router equipment continuously scans all available frequencies (or WiFi channels). Such listening on a plurality of channels is expensive, in particular in computation time. It is therefore advantageous to specify a channel number or frequency on which the wakeup identifier is to be received, e.g. as a parameter specified in a Livebox setup command.

In another variant, it is possible to imagine inhibiting reception during certain periods and to activate reception during other periods, e.g. on the basis of a cycle of alternating active and inactive reception states.

In another variant, the access point also has a "passive wakeup" mode that makes it possible either to return to the active standby state or to wake up completely if a communication request is sent thereto.

Figure 2:
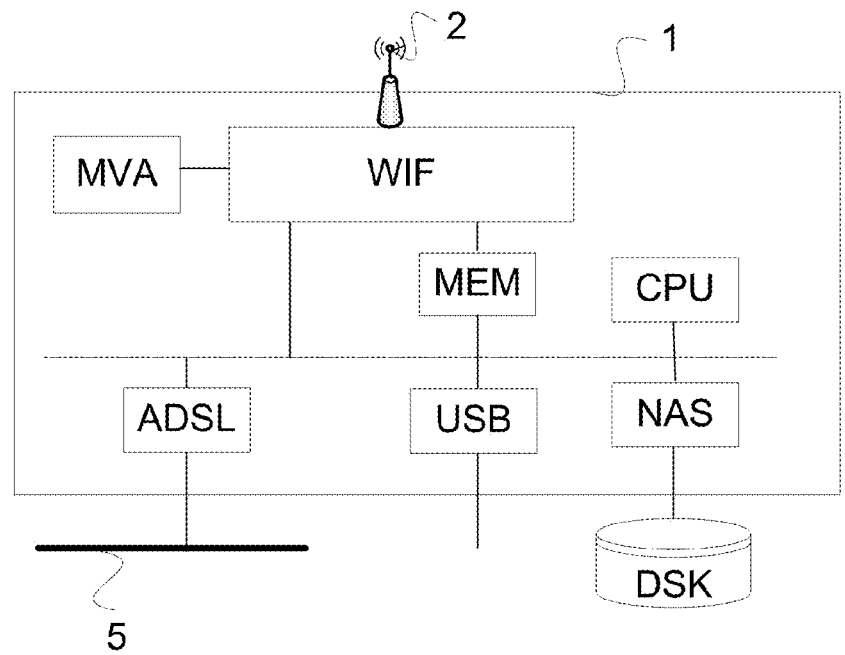
FIG. 2 is a block diagram of router equipment provided with a wireless function of the invention.

In another variant, it is possible to imagine that other appliances or peripherals connected to the router equipment, as described below with reference to FIG. 2, are in deep standby and are woken up only once the router equipment has itself left active standby. If the various pieces of equipment are also connected in WiFi mode, it is possible to imagine a cascade wakeup mode making use of the same procedure in succession between the various pieces of equipment that are connected: the terminal 3 wakes up the equipment 1, which wakes up the TV decoder, which wakes up the hard disk, . . . by transmitting the wakeup identifier WUP-SSID step by step. If these pieces of equipment have Ethernet connections, it is possible to imagine using a wakeup protocol of the Wake on Lan (WOL) type: WOL is a standard of Ethernet networks that enables a terminal that is switched off to be started remotely.

The purpose of all of these non-limiting variants is to improve the effectiveness of the invention by further reducing the consumption of electricity by the access point by suitably controlling its wireless communication function.

FIG. 2 is a diagram of the components of router equipment or a gateway of the invention.

The home gateway 1, such as that known under the trade name "Livebox", in this example comprises an ADSL modem that enables it to communicate over the wired link (Ethernet) 5, and a WiFi access point enabling it to connect terminals to the home gateway by radio 2 using the WiFi protocol. In conventional manner it also includes memories MEM arranged around a processor CPU. The memories may be of the read only memory (ROM) type or of the random access memory (RAM) type. A portion of the memory MEM is connected to the access point WIF and, amongst other things, it stores the parameters enabling the pieces of home equipment to be identified and associated with the access point WIF (a table of identifiers comprising the unique identifiers of the home terminals that are already authorized to access the home network via the access point, routing elements, etc., and in accordance with the invention a table of identifiers having the unique identifiers of those terminals that are authorized to wake up the gateway). The router equipment 1 also has an active standby module MVA for putting the access point WIF on active standby. By way of example, the active standing module MVA may be a software program that is executed in the memory of the router 1, or it may be a combination of hardware and software suitable for controlling the access point WIF in order to cause it to enter and leave the active standby state during which communication is inhibited in transmission.

In this example, the equipment also includes a universal serial bus (USB) interface module for connecting peripherals in USB serial mode (e.g. a hard disk or a printer, not shown), and a network attached storage (NAS) module that is connected to a virtual or physical disk DSK.

It should naturally be understood that if the piece of equipment is not a router, then it does not have an access point as such, in which case the module WIF comprises the WiFi communication function of the equipment.

Figure 3:
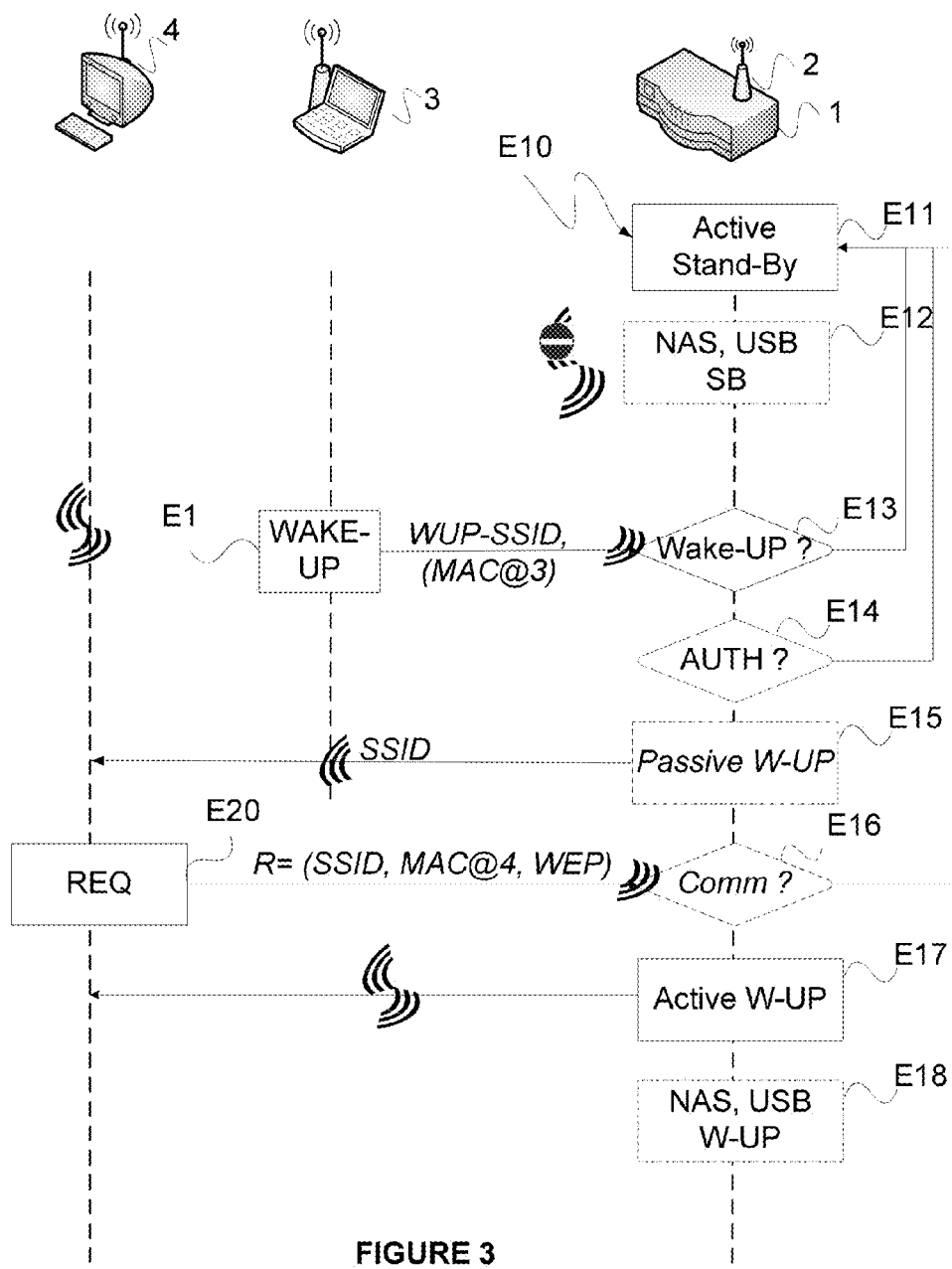
FIG. 3 shows data exchanges between router equipment of the invention and two terminals of the invention.

FIG. 3 is a diagram showing the steps of a method of controlling (i.e. putting on active standby and waking up) the access point of the invention in the router equipment 1 that is in WiFi communication over a radio link 2 with the two peripherals 3 and 4 of FIG. 1.

During a step E10, the router equipment is put on active standby in accordance with the invention. This active standby may be triggered by a button, by a command received over a wireless or a wired network, etc. At the end of this step, the equipment enters active standby during a step E11, i.e. communication of the access point is inhibited in transmission while being allowed in reception, as represented by the "no entry" road sign. The access point listens but no longer transmits. In the variants proposed above with reference to FIG. 1, it is also possible to envisage limiting this listening to a specific channel, to allow it to take place only in intermittent or cyclic manner, or indeed to limit the power of this reception.

In yet another variant, it is possible to envisage that, at the end of the step E11, the peripherals connected to the router equipment, e.g. the NAS and the USB concentrator are also put into standby mode, during an optional step E12.

During a step E1, the terminal 3 in charge of waking up the router equipment sends a wakeup signal in the form of an identifier. In this example, it is an SSID type identifier that is different from the SSID of the access point, and referred to as the wakeup SSID (WUP-SSID). Optionally, the MAC address corresponding to the address of the network interface of the terminal 3 (MAC@3) is also sent over the radio link.

When the access point detects information on the radio channel, it reads it, and in a step E13 it compares it with a wakeup value that it has previously stored and that corresponds to the value for leaving active standby. If the equipment detects such a wakeup identifier, the active standby module MVA of the invention wakes up the access point in transmission, i.e. bidirectional communication is made possible once more. The access point conventionally begins to transmit information over the WiFi link to the terminals that might be looking for it (in particular it transmits its SSID, see step E15).

In a variant shown in step E14, the equipment verifies the identity to the terminal 3 in order to be certain that it is indeed authorized to wake it up. For example, the equipment has previously stored the unique physical addresses of those terminals that are authorized to wake it up, i.e. the terminal 3 in this example. When it recognizes the connecting terminal, the access point WIF leaves its passive wakeup step, otherwise if it is the address of the terminal 4 that is not authorized to wake it up, it returns to the active standby step E11. In a variant shown in steps E15 and E16, the access point is not yet completely woken up. In other words, during the step E15 following the wakeup step E13, it is placed by the active standby module MVA in a kind of intermediate state referred to as passive wakeup (step E15) that may precede an actual wakeup stage or else a return to active standby in step E11. During the actual wakeup step E16, the access point conventionally monitors whether a terminal is seeking to identify itself in order to enter into communication therewith. In this example, the (unique) identifier of a terminal is its physical MAC address corresponding to the address of its network interface. In the prior art, when a terminal is connected to the home network via the access point WIF, said terminal transmits a connection request (step E20) that includes this physical MAC address (MAC@4), the identifier of the home network (SSID), and optionally a network access key (WEP). The access point WIF has stored the unique physical MAC addresses of the terminals with which it has authorized access, i.e. the home terminals 3 and 4 in this example. When it recognizes the terminal seeking to make a connection, the terminal 4 in this example, the access point WIF leaves its passive wakeup step to switch into an active wakeup state in step E17. Otherwise, if no terminal (or no authorized terminal) seeks to set up communication with the router equipment, the access point leaves its passive wakeup state so as to go back to sleep in the active standby position by the method returning to step E11. When this variant implementation is not implemented, the step E16 is followed directly by active wakeup state E17.

In another variant shown diagrammatically in step E18, active wakeup of the equipment is followed by waking up the peripherals that were asleep in this example, namely the USB interface and the network storage NAS.

Figure 4:
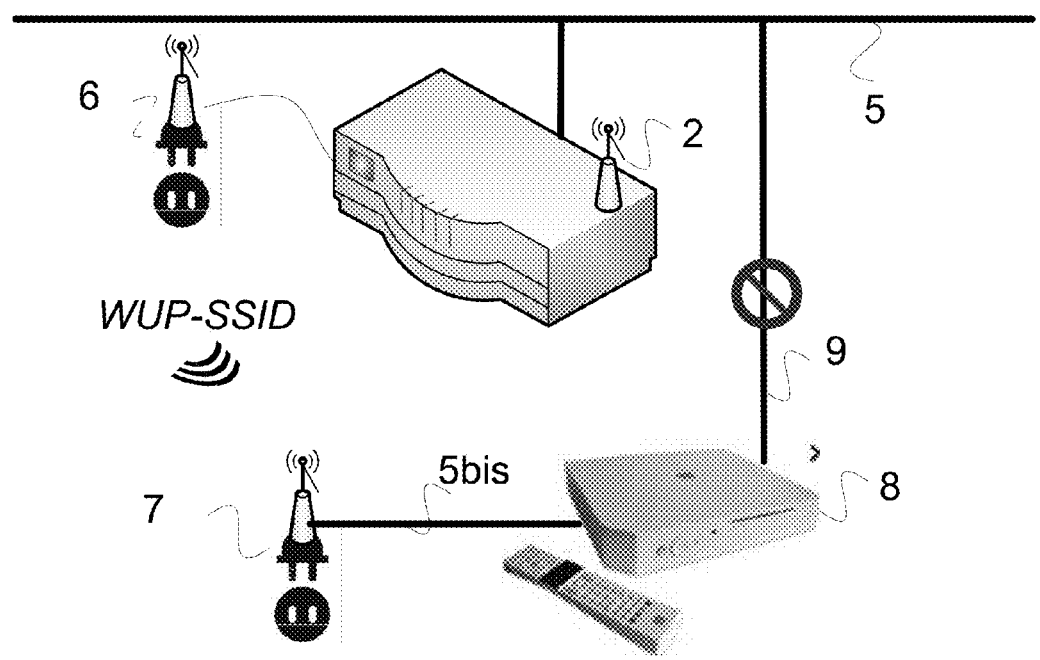
FIG. 4 shows another embodiment of the invention.

FIG. 4 shows a second embodiment of the invention. This time the home gateway 1 is connected to a WiFi transmitter 6 in the form of a WiFi plug that communicates with another WiFi plug 7 that is connected to a video decoder 8 (or set-top-box) (STB). This type of configuration is frequently encountered when the home gateway is not located close to the STB. Unlike the embodiment shown in FIG. 1, the communication of interest is thus that which is set up in WiFi between the two plugs 6 and 7. This is no longer communication within a network controlled by a router having an access point (in a so-called "network infrastructure" mode), but merely point-to-point communication (in a so-called "ad-hoc" mode) between two pieces of equipment, each having a WiFi function. It is assumed that the STB is on standby, thereby achieving a significant saving in consumption. In order to wake it up from the home gateway (e.g. because a user seeks to watch TV), there does not exist any simple solution at present: either the WiFi plugs are active, which is generally the case, in which case they are in continuous communication over the WiFi channel; or else the WiFi plugs are inactive (e.g. unplugged), in which case it is naturally not possible to wake up the STB using the WiFi link. In the prior art, it is possible to use a wired connection 9 (Ethernet), but that may be complicated to implement, depending on the layout of the home network. The invention makes it possible to do without the wire 9 as follows: the WiFi plug 7 of the STB is positioned in active standby, as explained above with reference to FIG. 2. In order to cause it to leave this mode, the WiFi plug 6 transmits a wakeup signal (WUP-SSID) over the radio link. When the WiFi plug 7 recognizes this wakeup identifier, it leaves its active standby state in order to enter either into a passive wakeup state, as described above, while waiting for communication confirmation, or else in order to enter directly into an active wakeup state that enables it to wake up the STB, assuming it was on standby.

Specifically, the Ethernet wired link 5b is between the WiFi plug 7 and the STB 8 also consumes energy. In the invention it is possible to envisage reducing this energy consumption by deactivating this connection while the WiFi plug is in its active standby state and to wake up this connection subsequently (e.g. by means of a Wake on Lan (WOL) signal as mentioned above).

The terminal 3 of the invention is provided merely with a software or hardware module for generating the message including the wakeup identifier WUP-SSID, e.g. a software application installed on the terminal and launched by an external action: reading a near field communication (NFC) label, geographical position, user action, . . . .

Naturally, the embodiments and implementations described above are given purely by way of non-limiting indication, and numerous modifications can easily be provided by the person skilled in the art without thereby going beyond the ambit of the invention.

The invention claimed is:

1. A method of controlling equipment having a function for controlling a bidirectional radio link in reception and in transmission, the equipment being configured to connect with at least one terminal of a home network via said link, wherein the method comprises:
   inhibiting the radio link in transmission for all terminals of the home network;
   modifying the radio link in reception;
   listening to the radio link in reception;
   detecting a wakeup identifier on the radio link from a terminal of the home network;
   verifying validity of said terminal that sent the wakeup identifier; and
   as a function of the value of this identifier and of the validity of said terminal that sent the identifier, activating the radio link in transmission for all terminals of the home network.

2. A method of controlling equipment according to claim 1, wherein activation of the radio link in transmission becomes effective after the equipment has received a request for communication.

3. A method of controlling equipment according to claim 1, wherein modifying the radio link in reception includes providing periods during which the radio link is inhibited in reception.

4. A method of controlling equipment according to claim 1, wherein the method further includes activating functional modules of the equipment after activating said radio link in transmission.

5. A method of controlling equipment according to claim 1, wherein modifying the radio link in reception includes adapting listening power.

6. A method of controlling equipment according to claim 1, wherein modifying the radio link in reception includes selecting a listening frequency.

7. Equipment comprising:
   control means for controlling a radio module in order to connect with at least one terminal of a home network;
   inhibit means for inhibiting the radio link in transmission for all terminals of the home network;
   modifying the radio link in reception;

listener means for listening to the radio link in reception;
detector means for detecting a wakeup identifier on the radio link from a terminal of the home network;
verification means for verifying validity of said terminal that sent the wakeup identifier; and
activation means for activating the radio link in transmission for all terminals of the home network as a function of the value of the wakeup identifier and of the validity of said terminal that sent the identifier.

8. A non-transitory computer-readable medium comprising a computer program stored thereon and suitable for being performed on equipment provided with a function for controlling a bidirectional radio link in reception and in transmission, the equipment being configured to connect with at least one terminal of a home network via said link, the program comprising code instructions that, when the program is executed by a processor, perform a method comprising:
inhibiting the radio link in transmission for all terminals of the home network;
modifying the radio link in reception;
listening to the radio link in reception;
detecting a wakeup identifier on the radio link from a terminal of the home network;
verifying validity of said terminal that sent the wakeup identifier; and
as a function of the value of this identifier and of the validity of said terminal that sent the identifier, activating the radio link in transmission for all terminals of the home network.

9. A system comprising:
a terminal of a home network comprising:
connection means for connection to equipment; and
sender means for sending a wakeup identifier over a radio link to the equipment; and
the equipment, which comprises:
control means for controlling a radio module in order to connect with the terminal of the home network;
inhibit means for inhibiting the radio link in transmission for all terminals of the home network;
modifying the radio link in reception;
listener means for listening to the radio link in reception;
detector means for detecting the wakeup identifier on the radio link from the terminal of the home network that sent the wakeup identifier;
verification means for verifying validity of the terminal that sent the wakeup identifier; and
activation means for activating the radio link in transmission for all terminals of the home network as a function of the value of the wakeup identifier and of the validity of the terminal that sent the identifier.

* * * * *